US010782965B2

(12) United States Patent
Mograbi-Lapiner et al.

(10) Patent No.: US 10,782,965 B2
(45) Date of Patent: Sep. 22, 2020

(54) MONITORING OF MEDIA DISPLAYED BY THIRD-PARTY COMPONENTS

(71) Applicant: SafeDK Mobile LTD., Herzliya (IL)

(72) Inventors: Maya Mograbi-Lapiner, Tel Aviv (IL); Ori Lentzitzky, Raanana (IL); Ariel Cattan, Raanana (IL); Idan Mandil, Shaar Efraim (IL); Eldad Moneta, Givatayim (IL); Orly Shoavi, Herzliya (IL); Ronnie Sternberg, Ramat Hasharon (IL)

(73) Assignee: SafeDK Mobile LTD., Herzliya (IL)

( * ) Notice: Subject to any disclaimer, the term of this patent is extended or adjusted under 35 U.S.C. 154(b) by 137 days.

(21) Appl. No.: 16/077,584

(22) PCT Filed: Mar. 26, 2018

(86) PCT No.: PCT/IL2018/050342
§ 371 (c)(1),
(2) Date: Aug. 13, 2018

(87) PCT Pub. No.: WO2018/185743
PCT Pub. Date: Oct. 11, 2018

(65) Prior Publication Data
US 2019/0377572 A1   Dec. 12, 2019

Related U.S. Application Data

(60) Provisional application No. 62/480,479, filed on Apr. 2, 2017.

(51) Int. Cl.
*G06F 8/77*       (2018.01)
*G06Q 30/02*     (2012.01)
*G06F 16/00*     (2019.01)

(52) U.S. Cl.
CPC ............ *G06F 8/77* (2013.01); *G06Q 30/0276* (2013.01); *G06F 16/00* (2019.01)

(58) Field of Classification Search
USPC .................................................... 705/14, 319
See application file for complete search history.

(56) References Cited

U.S. PATENT DOCUMENTS 10,631,036 B1 *   4/2020   Rabbat ............. H04N 21/23418
2009/0304082 A1 * 12/2009   Radhakrishnan ..... G06T 1/0028
375/240.15

(Continued)

FOREIGN PATENT DOCUMENTS

WO     2016081875 A1     5/2016

OTHER PUBLICATIONS

Open DRM and the Future of Media, Victor Torres, Carlos Serrao and Miguel Sales Dias (Year: 2008).*

(Continued)

*Primary Examiner* — Gautam Ubale

(57) ABSTRACT

System, method and products for monitoring media displayed by third-party components. A runtime component monitors execution of a program on the user device. The runtime component identifies an attempt by a third-party component that is integrated with the program to display media. The runtime component obtains obtain data associated with the media, determines a fingerprint of the media and transmits to a server the data and the fingerprint. In response to a request received from the server or lack thereof, the runtime component determines whether to drop the media or transmit the media to the server. The server is provided with aggregated data about different medias displayed by third-party components by different instances of the program executed by different user devices.

18 Claims, 12 Drawing Sheets

(56) References Cited

U.S. PATENT DOCUMENTS

| | | | |
|---|---|---|---|
| 2012/0265328 A1* | 10/2012 | Kadirkamanathan | ....................... H04L 65/1069 700/94 |
| 2015/0319490 A1* | 11/2015 | Besehanic | ........ H04N 21/44222 725/19 |
| 2016/0378578 A1* | 12/2016 | Nandakumar | .......... G06F 9/547 719/328 |
| 2018/0012256 A1* | 1/2018 | Napchi | .............. G06Q 30/0257 |

OTHER PUBLICATIONS

Real-Time Communications for the Web, Cullen Jennings, Ted Hardie, and Magnus Westerlund (Year: 2013).*
A Software Platform for Distributed Multimedia Applications, Christian Blum and Refik Molva (Year: 1996).*
The Control of Media Within an Internet of Things Using SMPTE ST 2071, Steven Posick (Year: 2015).*
Jun. 26, 2018 ISR and Written Opinion of ISA/IL for PCT/IL2018/050342.

* cited by examiner

| Watchlist ◉ Scrambled Colors | 36 Total SDKs | 1.43M MAU | | | | Select Watch ▼ | Advanced Filters | Clear |
|---|---|---|---|---|---|---|---|---|

| Creatives — 220 | Last Day ▼ | ▼ | < | > | = | All App Versions ▼ | Impressions: highest first | ✓ |
|---|---|---|---|---|---|---|---|---|

Interstitials / End Cards
Banners — 222
Campaigns
Ad Networks
Ad Issues
Auto-Redirects
Ad Crashes Banners displayed in app (21)

| Instagram<br>Free - Over 179 million... | 252<br>Install | Madonna meets...<br>View now | |
| Impressions: — 254<br>CTR: — 256<br>SDK: | 21.91K<br>N/A<br>Facebook Audience Network | Impressions:<br>CTR:<br>SDK: | 13.85K<br>N/A<br>inMobi |
| 258  259 — See More | | See More | |

250 →

| PAPER | | Ship | Play<br>free! |
| Impressions:<br>CTR:<br>SDK: | Play<br>now!<br>13.84K<br>N/A<br>MoPub | Impressions:<br>CTR:<br>SDK: | 13.74K<br>N/A<br>inMobi |
| See More | | See More | |

Fig. 2D

MONITORING OF MEDIA DISPLAYED BY THIRD-PARTY COMPONENTS

CROSS-REFERENCE TO RELATED APPLICATION

This application claims the benefit of U.S. Provisional Application No. 62/480,479 filed Apr. 2, 2017, entitled "METHOD FOR DETECTION AND PRESENTATION OF ADVERTISEMENTS DISPLAYED TO MOBILE USERS WITHIN A MOBILE APPLICATION", which is hereby incorporated by reference in its entirety without giving rise to disavowment.

TECHNICAL FIELD

The present disclosure relates to software integration in general, and to monitoring activity of third-party components that are used by a program, in particular.

BACKGROUND

Today the clear majority of mobile applications, such as running on Android™ iOS™, and other mobile operating systems, present advertisements (or "ads") to end users. Ads come in various forms and shapes—banners, interstitials, native ads, rewarded video ads, playable ads, or the like. In most cases, the ads are generated by Software Development Kits (SDKs), referred to as advertisements SDKs or Ad SDKs, which are embedded into the application code for this purpose.

SDKs are embedded in the code of the application. In some cases, the developer may select one or many Ad SDKs to serve ads to her end users in order to monetize users. In some cases, the Ad SDK may provide a connection to an ad network. The ad network may be in charge of connecting advertisers to publishers that want to host advertisements. The advertisers may be brand owners that wish to advertise to end users, while the publishers may be content owners and other entities that have end users to which the ads may be displayed. One form of publishers is app developers who release applications that display ads, thereby generating revenue to the app developer or owner. The ad network may aggregate ad space supply from publishers and match it with demand from advertiser. The ad network may utilize different payment schemes, such as pay-per-click, pay-per-impression, or the like. In some cases, the ad network may track demographic information, behavioral information, and other information regarding the end users and utilize such information to better match the ad thereto. Different ad networks may have different information and therefore may provide a different potential yield for monetizing a same end-user. In some cases, the ad network may match an ad placement opportunity, also referred to as an impression, offered by a publisher, regarding an end-user (e.g., current visitor of a website, current user operating an app), with an advertiser to be used for an ad using a bidding mechanism, such as real-time bids.

BRIEF SUMMARY

One exemplary embodiment of the disclosed subject matter is a computer program product comprising: a non-transitory computer readable medium retaining program instructions of a runtime component; wherein a developer of a program integrated the runtime component with the program, whereby the runtime component is operatively coupled with the program; wherein the program instructions, when executed by a user device, cause the user device to: monitor execution of the program on the user device; identify an attempt by a component of the program to display media to a user of the user device, wherein the component is a third-party component developed by a different developer than the developer and integrated with the program by the developer; obtain data associated with the media; determine a fingerprint of the media; transmit to a server the data and the fingerprint, whereby transmitting lightweight data to the server; in response to a request received from the server or lack thereof, determine whether to drop the media or transmit the media to the server; whereby providing the server with aggregated data about different medias displayed by third-party components by different instances of the program executed by different user devices.

Optionally, the third-party component is a Software Development Kit (SDK) that is compiled into the program by the developer.

Optionally, the SDK is an advertisement SDK configured to serve advertisements to users of the program, wherein the media is an advertisement.

Optionally, the advertisement is selected from a group consisting of: a static image, a dynamic image, a video, and an interactive advertisement.

Optionally, the runtime component is configured to heuristically verify that the media is an advertisement based on the media being displayed by an Software Development Kits (SDK) and not by the program.

Optionally, the runtime component is configured to heuristically verify that the media is an advertisement based on the media being displayed by an Advertisement Software Development Kit (SDK) and not by the program or by other SDKs.

Optionally, the determination of the fingerprint comprises computing a perceptual hashing of the media.

Optionally, the program instructions, when executed, are configured to cause the user device to compute the perceptual hashing a multiplicity of times to obtain multiple hashing values; and to compare the multiple hashing values to determine whether the media is static or dynamic.

Optionally, the determination of the fingerprint comprises obtaining a Uniform Resource Locator (URL) from which the media is played, wherein the fingerprint is the URL.

Optionally, the program instructions, when executed, are configured to cause the user device to verify that the media is an advertisement, wherein the verification comprises comparing aspect ratio of the media with a set of aspect ratios used by advertisements for a device having a displayed aspect ratio as of the user device.

Optionally, in response to the verification, the runtime component is configured to notify the server that the component is potentially an Advertisement Software Development Kit (SDK), whereby automatically identifying Advertisement SDKs.

Optionally, the runtime component is configured, in response to a second request received from the server, temporarily retaining the media on the user device until the request is received.

Optionally, the monitoring of execution comprises: scanning, periodically, visual objects of the program during runtime to identify visual objects associated with an Advertisement Software Development Kit (SDK).

Optionally, said monitoring of execution comprises: scanning visual objects of the program during runtime; for each visual object, determining a component responsible for the visual object, wherein said determining comprises performing stack trace analysis to identify the component; and comparing the component with predetermined set of Software Development Kits (SDKs).

Optionally, in response to identification of the attempt to display the media, the runtime component is configured to render the media in a resolution lower than a resolution in which the media is to be displayed by the program, whereby down-sampling the media to obtain a lightweight representation thereof.

Optionally, the component is an Advertisement Software Development Kit (SDK), wherein the media is an advertisement, wherein the runtime component is configured to determine, based on blocking rules, whether to allow the advertisement to be displayed, wherein the blocking rules are determined by the developer; whereby the developer selectively blocking a portion of advertisements served by the Advertisement SDK, thereby potentially reducing generated revenue for the developer from the program.

Optionally, the developer integrated the runtime component with the program by compiling the runtime component with the program, by statically linking the runtime component with the program, or by causing the program to dynamically link to the runtime component during execution.

Optionally, the runtime component is a Software Development Kit (SDK) provided by a provider different than the third-party and the developer, wherein the developer included the SDK in the program.

Yet another exemplary embodiment of the disclosed subject matter is a system comprising: a server coupled with a media database, wherein the media database retaining for each media, a fingerprint of the media, a visual representation of the media received from a user device, and values of one or more performance-related metrics; a plurality of user devices, wherein the user devices retaining a program developed by a developer, wherein the program is operatively coupled with a runtime component and a media display component, wherein the runtime component is configured to monitor execution of the program to identify attempts by the media display component to display a media to a user, wherein the runtime component is configured to determine a fingerprint of the media and obtain data relating to the one or more performance-related metrics, wherein the runtime component is configured to transmit the fingerprint and the data to the server; and wherein the server is configured to identify multiple transmissions regarding a same media from multiple user devices and to instruct one device to transmit the media to the server and to instruct other devices to avoid transmitting the media to the server.

Optionally, the server is configured to update a record regarding the media in the media database based on the data of all the multiple transmissions.

Optionally, the server is configured to select the one device based on at least one of the following: a connectivity status of the one device, a battery level of the one device, and a number of past requests from the one device to transmit medias to the server.

Optionally, said server is configured to: in response to receiving a first transmission from a first device regarding the one media, determining, using the fingerprint, whether a copy of the media is retained in the media database; in response to a determination that the copy is not retained in the media database, notifying the first device to temporarily retain the media; in response to receiving a second transmission from a second device regarding the one media, determining which of the first and second device is to upload the media to the server; and based on the selection, transmit a first request to one of the first and second devices to upload the media to the server and transmit a second request to another of the first and second devices to locally delete a retained copy of the media.

Optionally, the server is configured to identify copies of a same media based on the fingerprint values of the copies being identical or having a distance lower than a predetermined threshold distance.

Optionally, the server comprising a dashboard component configured to display to the developer media displayed by different instances of the program and performance related values regarding thereto.

Optionally, a plurality of different media display components are integrated into the program, wherein the plurality of different media display components are Advertisement Software Development Kits (SDKs), wherein the dashboard component is further configured to enable the user to view performance related values of the advertisement when being served by one of the Advertisement SDKs and performance related values of the advertisement being served by any of the Advertisement SDKs.

Optionally, the server comprises a dashboard component configured to enable the developer to provide selective blocking rules for selectively blocking medias based on past performance or content policy, whereby the developer blocking medias regardless of an identity of a media display component displaying the medias, wherein the runtime component is configured to implement the selective blocking of the medias.

Optionally, a plurality of different media display components are integrated into the program, wherein the plurality of different media display components are Advertisement Software Development Kits (SDKs), wherein the system comprising a dashboard component that is configured to enable the developer to define selective blocking rules for blocking an advertisement when served by one Advertisement SDK and for not blocking the advertisement when served by another Advertisement SDK.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 2A-2H show illustrations of a dashboard, in accordance with some exemplary embodiments of the disclosed subject matter;

DETAILED DESCRIPTION

Figure 1A:
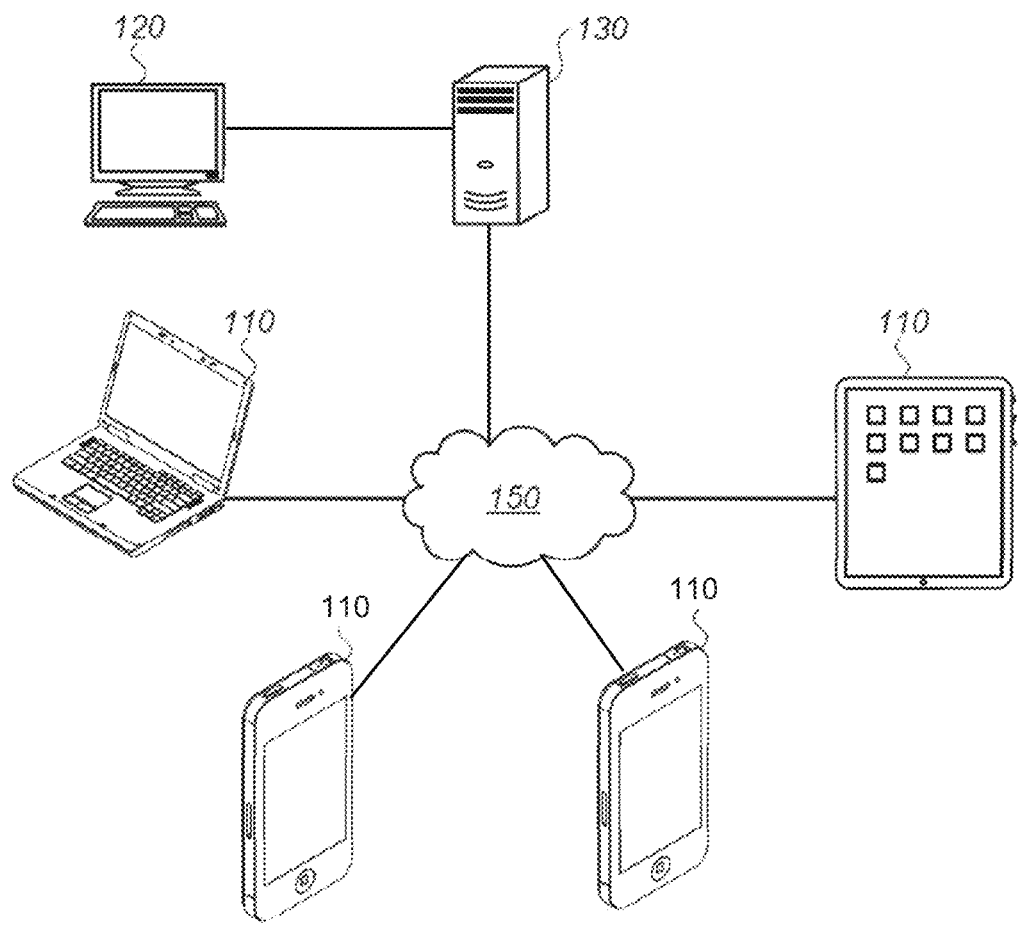
FIGS. 1A-1B show illustrations of a computerized environment, in accordance with some exemplary embodiments of the disclosed subject matter.

One technical problem dealt with by the disclosed subject matter is to collect information about ads displayed by Advertisement SDKs to users of a program, and provide such information to the developer of the program.

Even though program developers purposely embed Advertisement SDKs in their apps in order to monetize on the users of their program, the developers have limited control and no way of knowing what actual ads and campaigns are being displayed to their users. The Advertisement SDKs may fetch ads from multiple sources and ad networks. In some cases, the ads that the developer sees when operating the program may be different than those served to other users, such as in view of different geographic location, different demographic and different historic activities of the users. For example, users who often visit websites with adult content may be targeted by the Advertisement SDK and served with ads for adult content. The developer, on the other hand, may never see such ads, and may be unaware that her program is associated with adult content.

In addition, the ads may be presented in a visual manner. Whether it is interstitials, banners, animated GIFs, pre-rolls, videos, or any other form of media, the ad itself may not be accompanied by textual information useful for identification thereof. In some cases, ads may be purely textual (e.g., textual banners, where a template visual display is used to render the text into a visual manner), reducing the technological challenge related to identifying the ads and comparing different ads. For example, and is discussed below, resolution and screen layout may affect a media, while such parameters may not affect textual ads (but rather only the display thereof). As such, identifying the same textual ad in different devices, may involve a reduced technical challenge, compared to identifying the same media-based ad in different devices.

The information may be important to the developer for various reasons. In some cases, the developer may wish to ensure her brand is protected (e.g., brand safety). In some cases, program repositories, such as GOOGLE PLAY™ and APPLE APP STORE™, may have certain policies the program must follow, or be removed from the repository. The developer may wish to ensure that her program is in line with such policies and that the Advertisement SDKs, that were incorporated by her, but are not controlled by her, do not violate such policies. As another example, the developer may have a conflict of interest with the owner of the Advertisement SDK and with other advertisers. One example of a conflict of interest may be as follows. Other advertisers may be competitors offering alternative services to those of the program. As a result, advertising such alternative services, may cause the end users of the developer to start using other services instead of using the developer's program, thus adversely impacting the developer. Another example of a conflict of interest may be related to traffic diversion. The advertisement may re-direct the end user to other apps or websites, diverting traffic from the developer's program to other outlets. Such redirection may be in the interest of the advertiser and of the owner of the Advertisement SDK, but not in the interests of the developer. As another example, some ads may have bugs and errors. For example, ads may be displayed in a distorted manner. As another example, ads may cause the program to crash due to a bug. Although the source of the error is not in the developer's code, such errors may adversely affect her, as her users may churn and stop using the program due to bugs and crashes. In order to avoid such adverse effect, the developer may wish to monitor the activity of the Advertisement SDK, and to be aware of potential issues, such as bugs, distorted display, noisy ads, ads emitting alarming sounds, or the like. In some cases, the audio of the ad may create an adverse effect on the user experience and may require the developer's attention, such as by blocking the ad completely, blocking the soundtrack of the ad, limiting the volume of the audio of the ad, or the like.

Another technical problem may be to automatically identify the advertisements. While advertisements may be easily spotted by a human, they may not be easily identifiable by a computer and distinguished from other content displayed by the program. As the Advertisement SDK is the one serving the advertisement, and as the developer may not have access to the code of the Advertisement SDK, and such SDK may not provide an Application Programming Interface (API) for querying it to receive displayed advertisements, tracking served advertisements may pose a technical challenge. Such a challenge may also exist due to not having an executable process external to the program that may monitor the display. Mobile devices may implement sandboxes preventing from one process to observing the operation of another process. Sandboxing may prevent from monitoring the display itself and identifying advertisements in the display, using an external process.

Yet another technical problem may be to identify an SDK that is responsible for an advertisement. In some cases, the developer may incorporate a plurality of SDKs for ad serving, and utilize them in different scenarios, such as prioritizing them and providing a placement opportunity to one SDK only after another SDK was unable to fulfill it, and such as creating concurrent bids in different Ad Networks to increase the overall revenue from advertisements. Monitoring the displayed ads and matching them to the different SDKs that served each of them may present a technical challenge. Even more so, if such monitoring is to be performed by an SDK providing the functionality of the disclosed subject matter, and without the developer adding code to track invocations of the different SDKs herself.

Yet another technical problem is to identify the advertiser of an advertisement. In some cases, certain advertisers may not be welcomed and the identity thereof may be of importance. However, the SDK and the ad may not directly provide the identity of the advertiser and there may not be any API for querying for such information.

It is noted that in some cases, some ad providers may publish deceiving ads, which may attempt to seduce the user to click it in a deceitful or even fraudulent manner. For example, the ad may appear to promote something that appears to be of interest or enticing to the user, but the landing page, to which the user is directed when clicking on the ad may be something completely different. In such cases, the ad provider is awarded for deceitful or near-fraudulent clicks. It may be desired to provide for a technical means to identify such ads and ad providers, even if such activity is a well disguised (e.g., provided to only a fraction of the users, employed with respect to audience that is known not to be the app owner (e.g., targeting China for such activity, for US-based developers, and vice versa in case of China-based developers), performed in a relatively small number of times (e.g., about less than 1%, 10% of the ads). Such well-disguised activity may be hard for the developer to identify, and may therefore be a cause for concern and uncertainty for developer using third-party ad providers.

Yet another technical problem may be to report the information gathered by the user devices to a server in an efficient manner. In some cases, reporting may include uploading images and other relatively large files. Uploading such files may require resources, such as bandwidth, power, or the like. Efficient reporting may be desired in order to avoid over-utilization of resources of the user devices as a whole and avoid over-utilization of resources of each user device, individually.

Yet another technical problem may be to identify a same advertisement when displayed in different devices. Different devices may receive different versions of the same advertisement, such as images having different proportions in view of the aspect ratio of the screen of the device or current orientation thereof, videos having different resolutions in view of different connectivity statuses, or the like.

One technical solution is to couple a runtime component to the program. The runtime component may be an SDK itself, that is integrated, statically or dynamically, into the program. The runtime component may be deployed in different instances of the program, retained on different devices and used by different users. Each runtime component may monitor the execution of the program.

In some exemplary embodiments, the runtime component may be configured to obtain a fingerprint of the media and data relating thereto. The fingerprint may be a lightweight representation of the media, such as a URL thereof, a hash value thereof, or the like. In some exemplary embodiments, the fingerprint may have a size of about 20 Bytes, 100 Bytes, 1 KB or the like, while the media itself may have a size larger by several orders of magnitude, such as 50 KB, 100 KB, 500 KB, 1 MB, or the like. The fingerprint and data may be transmitted to a server for aggregation. The server may determine whether the media was previously received and is retained in a database. If the media is not already retained, the server may request from the runtime component to upload the media itself. In some exemplary embodiments, the server may indicate to the runtime component that the media need not be uploaded, and the media may be dropped and stopped from being retained locally.

In some exemplary embodiments, the media may be retained temporarily until a determination is made as to which instance of a runtime component is to upload the media. In some exemplary embodiments, the determination may be performed so as to provide a balanced resource utilization from different devices, avoiding over-utilization of a certain device. For example, instead of having the same device upload many copies of medias and utilize significant bandwidth thereof, the same information may be uploaded by different 100 devices, each of which utilizing approximately 1% of the total required bandwidth. For example, if the total size of medias to be uploaded is 50 MB, instead of having one device send all the information, 100 devices may share the load and send approximately 0.5 MB each, such as by each of them sending a different media. As another example, packets of the same media may be uploaded by different devices, and combined by the server to obtain the media in its original form.

In some exemplary embodiments, the runtime component may monitor for the creation and existence of visual objects in the program, also referred to as views. Views may be software components responsible for rendering information onto the screen of the device. Different alternative techniques for monitoring may be employed. In some cases, some techniques may only be applicable in some operating systems. In some exemplary embodiments, all views in the program may be scanned periodically. The order of the scan may be based on the order of the views, such as beginning from a top view (sometimes called "window") and scanning all its sub views recursively. Additionally or alternatively, method swizzling may be employed. Method swizzling may switch the implementation of an existing selector at runtime. In some cases, swizzling may be employed to hook into the creation of any view in the program. Additionally or alternatively, compile-time instrumentation of the program binary may be performed, so as to hook into the creation of any view in the program.

In some cases, each view may be checked to ensure it is visible. In some cases, the view may be hidden behind other views, may be set to be hidden, or the like. Non-visible Views may be disregarded.

Upon detection of a new view, the runtime component may check who's responsible for the creation of that view—is it an SDK that is used for serving ads, another SDK, or the application itself The detection of an SDK can be performed in various techniques. In one case, the class name of the view or the class name of the creator of the view may be checked and compared against SDK metadata, checking if the class belongs to an SDK. In some cases, the stack calls that lead to the creation of the view may be analyzed to identify an SDK in the stack. The SDK may be identified by name, by matching addresses against compile-time address range metadata, or the like. U.S. patent application Ser. No. 15/389,431, entitled Monitoring Activity of Software Development Kits Using Stack Trace Analysis, filed Dec. 22, 2016, which is hereby incorporated by reference in its entirety without giving rise to disavowment, describes manner enabling stack trace analysis to identify an SDK responsible for an activity. In some cases, compile-time instrumentation techniques may be used to identify the SDK. For example, view creation calls done by SDKs may be wrapped with additional code that indicate which SDK was responsible for creating the view.

If the detected view is identified as created by an Advertisement SDK, the view size and proportions may be checked. Mobile Ads have well-known sizes and proportions, such as a typical banner being 320×50 pixels in size. To accommodate different device screen resolutions, proportions may be utilized rather than exact sizes. Different proportions and aspect ratios may be utilized based on the size and resolution of the device screen. In some cases, all views may be checked for a potential banner regardless of whether the SDK is known to be an ad-related SDK, thereby potentially automatically identifying ad-serving SDKs based on crowd-sourced information.

Interstitials may be identified. The Runtime component may check if the view size occupies the full screen size, and if so identify an interstitial. Additionally or alternatively, the creation of an Activity. For example, in ANDROID™ OS, the creation of the activity may be identified when registering to activity lifecycle. The Activity may be identified as an interstitial. In some cases, only Activities of Advertisement SDKs are identified as interstitials.

In some cases, once an ad view has been identified, the runtime component may sample its image. In some exemplary embodiments, the runtime component may have the view render itself into a desired graphic context, and compute a fingerprint of the rendered image, such as by computing a hash value. The fingerprint may serve as a unique identifier of the image. The identifier may be used to determine whether the image was already reported to the server. In some exemplary embodiments, perceptual hashing may be used to account for potential differences, such as in view of different resolutions and different graphic contexts. Additionally or alternatively, the graphic context into which the ad is rendered may be predetermined and constant regardless of the screen size and resolution of the device, thereby providing for the same media in different devices with different displays. In some cases, the ad may have a dynamic image and the image may change over time. A series of hash values may be gathered to obtain the different images of the dynamic image. Additionally or alternatively, a URL from which the media is streamed may be identified and used as the fingerprint. In some exemplary embodiments. the URL may be analyzed to remove parameters therefrom which do not affect the obtained media, such as a referral id parameter sent as part of HTTP GET request may be removed, as opposed to campaign-id parameter which may be part of the fingerprint.

In some exemplary embodiments, the rendering of the media may be performed using resolution lower than a resolution in which the media is to be displayed. For example, the display may be a full High-Definition (HD) (e.g., 1920×1080), while the media may be rendered according to the disclosed subject matter in a resolution of Standard-Definition (SD) (e.g., 854×480). In some exemplary embodiments, the same proportions may be maintained. By rendering to a lower resolution, the media may be downsampled, and a lightweight representation thereof may be obtained. For example, instead of representing 2,073,600 pixels in HD, only 405,600 pixels may be represented in SD, reducing the number of pixels by a factor of five (5). The reduction may be of larger scale regarding higher HD representations, such as 4K Ultra-High-definition (UHD), 8K UHD, or the like, and if resolutions lower than SD are used, such as low-definition (LD) (e.g., 128×96, 256×144, or the like).

In some exemplary embodiments, the runtime component may be configured to identify crashes and redirections caused by an advertisement and report such information to the server.

In some exemplary embodiments, the runtime component may be configured to block display of certain advertisements. A developer of the program may define blocking rules, which may be defined after the program is distributed and without requiring re-compilation thereof. The blocking rules may be enforced to block display of certain advertisements, such as advertisements of competitors, advertisements with adult content, advertisements with bugs, advertisements diverting traffic, or the like. It is noted that the blocking is requested by the developer, and as a result, potentially reduces the revenue of the developer herself. Although the developer integrated the Advertisement SDK and allowed it to serve advertisements to the users, the developer may decide to block it completely or selectively block certain ads. In some cases, a same ad may be blocked regardless of the Ad network serving it, regardless of the Advertisement SDK serving it, or the like. This is very much different than conventional ad-blocking tools which are employed by the users of the programs. Users may wish to completely block advertisements. In addition, the users can only affect their own device, while the blocking rules affect all instances of program, used by different users.

The disclosed subject matter may provide for one or more technical improvements over any pre-existing technique and any technique that has previously become routine or conventional in the art.

Additional technical problems, solutions and effects may be apparent to a person of ordinary skill in the art in view of the present disclosure.

Figure 1B:
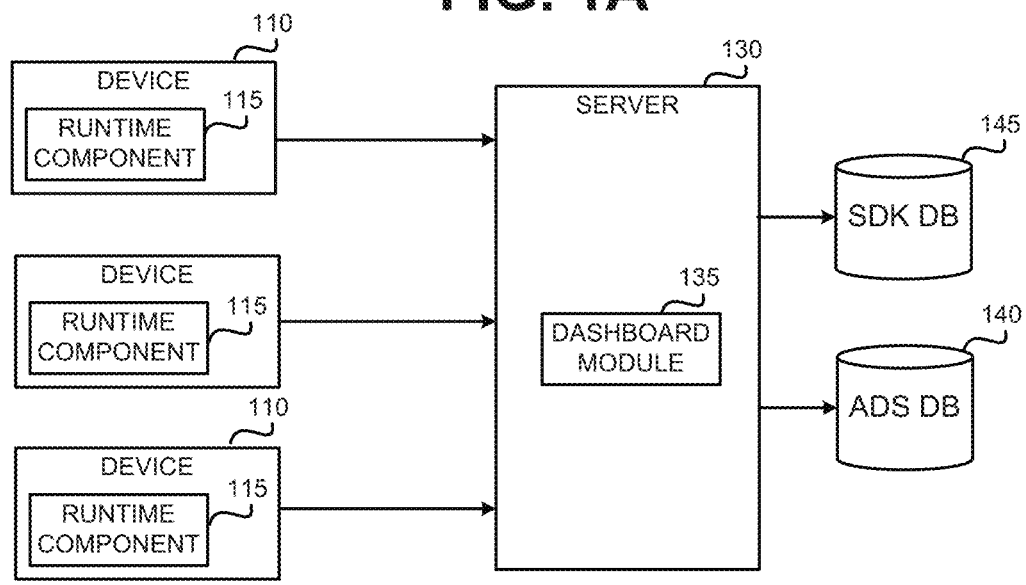

Referring now to FIGS. 1A-1B showing illustrations of a computerized environment, in accordance with some exemplary embodiments of the disclosed subject matter.

Network 150 is a computerized network enabling devices to communicate with one another. Network 150 may be, for example, an intranet, a LAN, a WAN, a WiFi network, the Internet, or the like.

Devices 110 may be computerized devices, of potentially different shapes and sizes, and potentially utilizing different operating systems. Devices 110 may have retained thereon a program (not shown) which was developed by developer. In some exemplary embodiments, the program may be distributed to Devices 110 via an online application repository, such as GOOGLE PLAY™, APPLE APP STORE™, or the like. The program may incorporate a third-party Advertisement SDK to serve advertisements to the end users.

In some exemplary embodiments, Devices 110 may be operated by different end users, may be located in different locations, or may otherwise differ from one another. As a result, different advertisements may be served to the different devices. In some cases, the same advertisement may be served to several of the devices.

In some exemplary embodiments, the program may incorporate, or otherwise have operatively coupled thereto, a Runtime Component 115. Runtime Component 115 may be provided as part of an SDK. In some cases, the Runtime Component 115 may be provided as part of an SDK that is external to the Advertisement SDKs. Runtime Component 115 may be configured to monitor advertisements served to by the program (e.g., by the Advertisement SDKs utilized by the program). In some exemplary embodiments, Runtime Component 115 may be configured to identify an attempt to display a media that is consistent with the properties of an advertisement, such as an interstitial, a banner, a pre-roll, or the like. Runtime Component 115 may be configured to obtain a fingerprint of the advertisement, track performance thereof, such as clicks, view time, crashes, redirections, or the like, and report to Server 130 the impression and its performance metrics. In some exemplary embodiments, the Runtime Component 115 may be configured to retain the advertisement itself and optionally upload the advertisement to Server 130.

In some exemplary embodiments, Server 130 may consult an Ads DB 140 to determine whether the advertisement for which an impression was reported exists. If the advertisement exists, the performance information may be added to the Ads DB 140 with respect to the advertisement. If the advertisement does not exist, the ad may be created in the Ads DB 140. In case the ad is created or in case the ad was recently created and no media of the ads is already available, Server 130 may instruct Runtime Component 115 to upload the ad itself. In some cases, the Server 130 may retrieve the ad from a URL provided by the Runtime Component 115, such as in case of a streaming video. In some exemplary embodiments, Server 130 may select one of a number of Runtime Components 115 that reported the ad, to upload the ad. For example, the selection may be based on a balancing of resource utilization by the Devices 110. Additionally or alternatively, the selected device may be a device having better connectivity, using free connection (e.g., Wi-Fi, instead of data plan) or otherwise a cheaper data connection, having sufficient battery level, being connected to a power source, or the like. In some exemplary embodiments, the server may postpone the selection, so as to allow additional devices the opportunity to report on the same ad. The server may transmit to the Runtime Component 115 an instruction to retain the ad temporarily until a final determination is made as to whether that instance will be asked to upload the ad or another instance. In some exemplary embodiments, Runtime Component 115 may decide to delete the ad, such as in view of having low free memory and wishing to evacuate memory. Runtime Component 115 may update Server 130 to notify Server 130 that the same instance is no longer a valid candidate for uploading the ad to Server 130.

In some exemplary embodiments, an SDK DB 145 may be utilized. SDK DB 145 may indicate for each SDK information relevant for identification thereof. In some exemplary embodiments, SDK DB 145 may indicate names of classes, packages, or the like. Additionally or alternatively, SDK DB 145 may indicate memory addresses of classes, functions, or the like. Such information may be useful for stack trace analysis to determine an SDK responsible for creating a visual object. The stack trace may be captured while the program is running. Additionally or alternatively, a stack track may be obtained in response to a crash of the program to determine whether the SDK and the advertisement was the cause of the crash. In some exemplary embodiments, SDK DB 145 may indicate for each SDK whether it is an advertisement SDK or not. In some exemplary embodiments, information from SDK DB 145 may be transferred to Devices 110, such as upon execution of the corresponding instances of the Runtime Component 115. Runtime Component 115 may utilize such information locally to analyze the stack trace, to determine which SDKs to track and which not to track, or the like.

In some exemplary embodiments, a Dashboard Module 135 may provide the developer an interface for reviewing information about the advertisements, Advertisement SDK, or the like. In some exemplary embodiments, the developer may utilize a device, such as 120, to connect to Server 130, and interact with the Dashboard Module 135. In some exemplary embodiments, the developer may select ads to be blocked, may define blocking rules to block certain Ad Networks or Advertisement SDKs, may define re-serving rules for defining which Ad Network, Advertisement SDK, or another service to offer a placement opportunity that was blocked by the blocking rules. In some exemplary embodiments, Dashboard Module 135 may enable the developer to define blocking rules that are based on an operating system, a device, or the like. In some cases, a certain ad may be considered as allowable for a first set of users and not allowable for a second set of users. The sets of users may differ in their demographic characteristics. Additionally or alternatively, the sets of users may differ in their devices, such as, for example, certain ads may cause crashes on certain devices, while not on others. For example, an ad may cause GALAXY S9™ to crash but not GALAXY NOTE 8™. As can be appreciated, the determination may be based on vendors of the device, exact model, operating system, or the like.

Referring now to FIGS. 2A-2H showing illustrations of a dashboard, in accordance with some exemplary embodiments of the disclosed subject matter.

Dashboard 200 may be an interactive dashboard with which the developer may interact to view information regarding her application and advertisements served to end-users, as well as to set rules, select ads to block, or the like. In the illustrated embodiment, a dashboard an application named Scrambled Colors (210) is shown. General statistics of the application is shown. For example, a number of total SDKs integrated with the application is shown (36 SDKs).

The total number may be a total number of SDKs that are automatically identified by the disclosed subject matter. In some exemplary embodiments, the developer may opt to view a list of the SDKs, thereby allowing her to validate or refute the automatically obtained information. Such feedback may be used to improve the automated extraction algorithm in future cases to better identify SDKs in program. As another example, a number of Monthly Active Users (MAU) may be displayed (1.43 million). Number of active users may be tracked by having the runtime component notify the server upon program launch. As a result, the server may track a number of unique instances that were actually launched and used in each month, to determine the MAU.

In some exemplary embodiments, Watchlist 215 may provide access to a list of ads which the developer has flagged for observation. In some exemplary embodiments, the system may provide suggested flagging and tagging of ads, and automatically add ads to Watchlist 215.

In some exemplary embodiments, the Dashboard 200 may have different display options. In each option, a different display may be shown in the display pane of Dashboard 200. A menu may be used to change the displays.

Figure 2A:
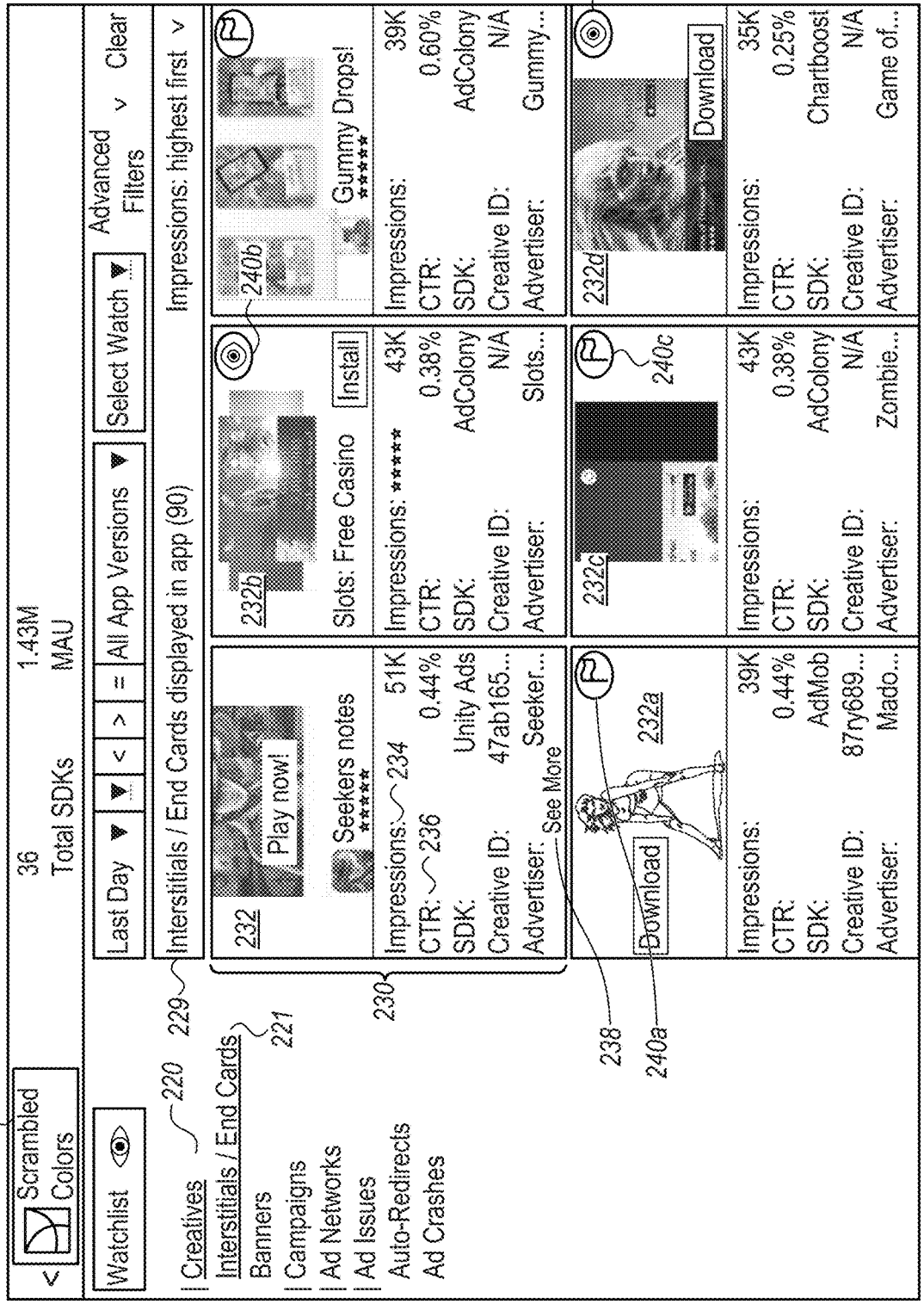

FIG. 2A shows Interstitials/End Cards display mode (221), which is a form of creative display (220). In the Interstitials/End Cards display mode, ads of certain types are shown. Different filtering criteria may be applied, including based on version of the app in which the ad was displayed, a tag or flag criteria, date of last observed impression, or the like. Banner 229 shows that the total of displayed ads in the current filtering mode is 90 and provides with a modifiable order criteria (e.g., based on number of impressions, from high to low). In some cases, search by advertiser, developer or category may be possible as well as performing bulk operations on several ads (e.g., by manually selecting several ads, or using a selection criteria)

Box 230 represents an advertisement. The media shown by the ad (232) is shown to the developer. This allows the developer to view the actual ad as displayed to the user, which might not ever be displayed to the developer when the developer is using the application. Additional performance metrics may be shown, such as number of total impressions observed of the advertisement (234; 51K), a Click Through Rate (CTR) indicating responsiveness of users to the ad (236; 0.44%). An SDK that served the ad (e.g., Unity Ads SDK), a Creative ID identifying the ad in the SDK or in an Ad Network, if obtained, and an identification of the advertiser, if obtained. It is noted that in some cases, the same ad may be served by several SDKs, each using a different creative ID. In such cases, the information about the ad may be aggregated, and SDK-specific data may be shown in a more detailed display of the data. The user may flag inappropriate advertisements, such as advertisement showing adult content. A visual indication of flagged advertisements may be shown. For example, Ad 232a may be flagged 240a for in appropriate content. Ad 232b may be flagged for potential regulations issue, as the ad promotes online gambling. In the illustrated example, Ad 232b is added to Watchlist 215 (240b). As another example, Ad 232c may be flagged for corrupt image (240c). Such ad may be flagged to be blocked in the future so as to prevent such corrupted ads from adversely affecting user experience of the end users. Ad 232d may be flagged for potential issue as potentially scary and not necessarily suitable for all audiences (e.g., promoting R-rated content). Ad 232d may have been added to the watchlist for future review.

Figure 2B:
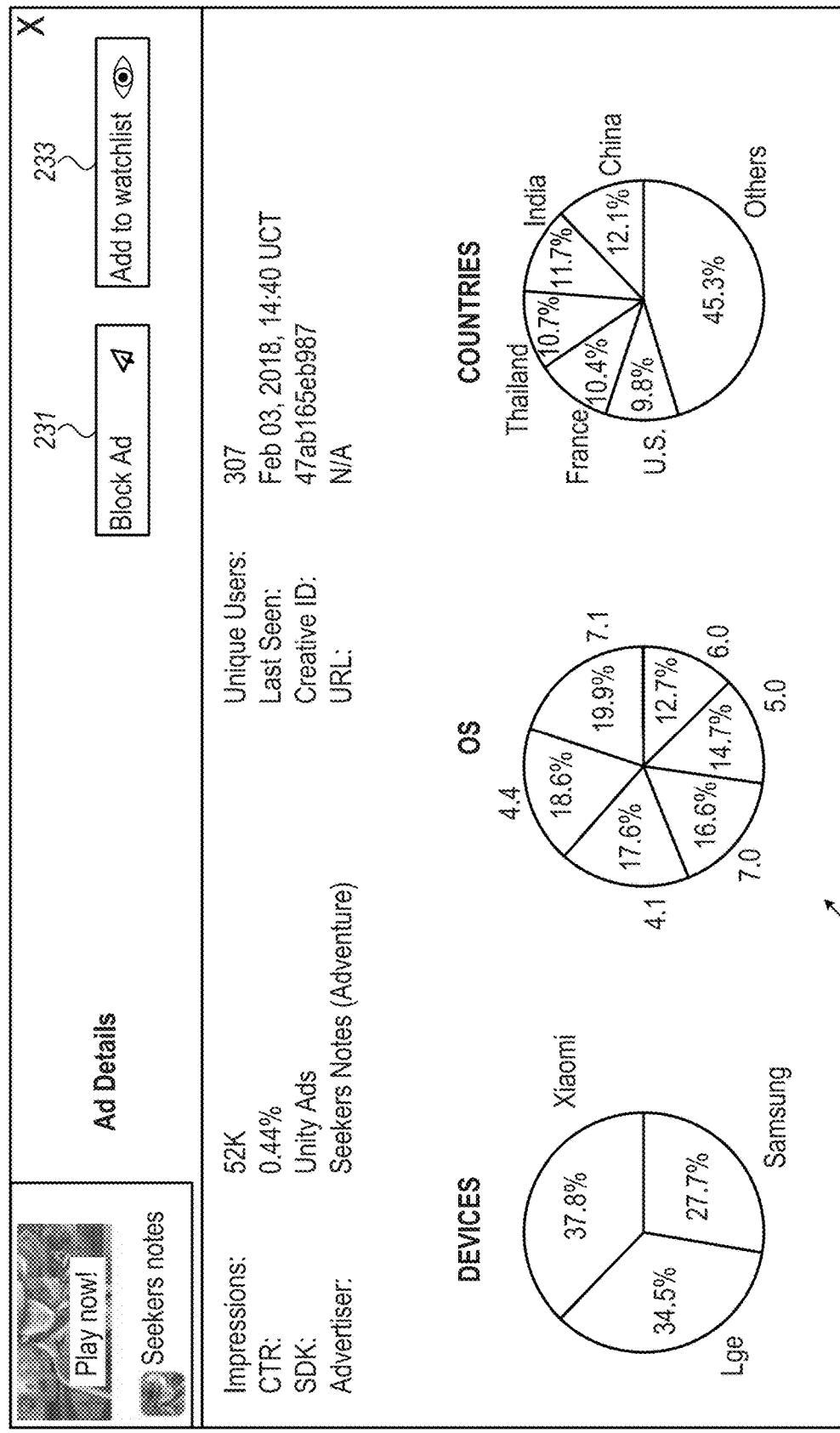

In some exemplary embodiments, See More 238 may be used to provide additional details about an ad, as is illustrated in FIG. 2B.

Detailed Ad Display 230b shows details of Ad 230. As an example, statistics such as total number of impressions, unique users, last observed time, creative ID, SDK serving the ad, Advertiser, or the like are shown. In some cases, such as in case the ad is streamed from a URL, the URL may be shown. Additional statics about the audience who the ad was served to may be shown in pane 235, such as distribution between different devices (e.g., 27.7% of the ads were served to SAMSUNG™ devices), distribution between different operating systems or versions thereof, distribution between different countries or other demographic information relating to the audience, or the like.

The developer may block Ad 230 using Block Button 231. Additionally or alternatively, the developer may add Ad 230 to the watchlist using Watchlist Button 233.

FIG. 2C shows information about creatives of the type of banners (222). Box 250 represents an advertisement, and the media displayed to the end user (252) is shown. Metrics, such as number of impressions (254), CTR (256), Serving SDK (258), or the like, may be shown for the advertisement. Additional information may be shown via a see more button (259).

Figure 2D:
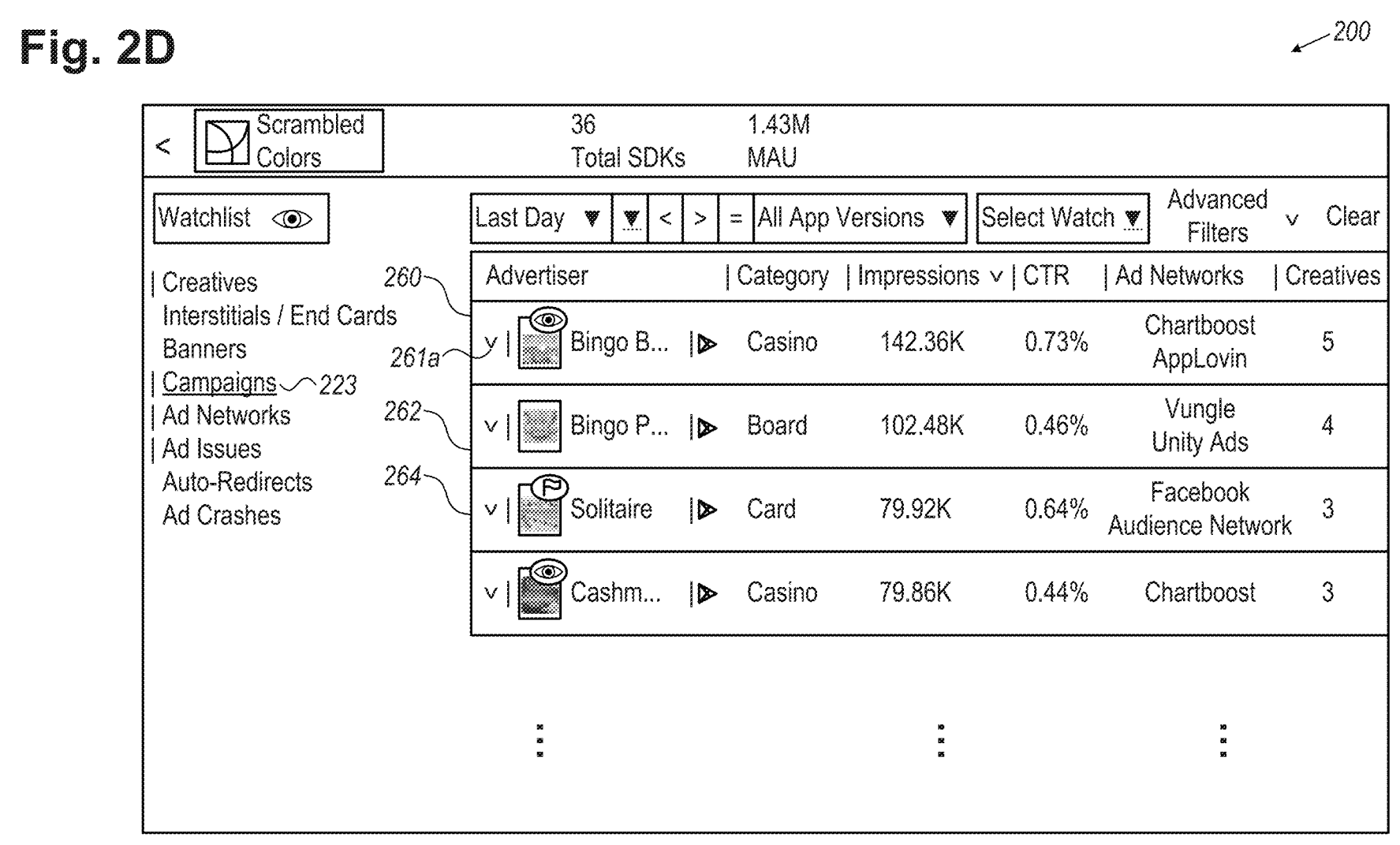
Figure 2E:
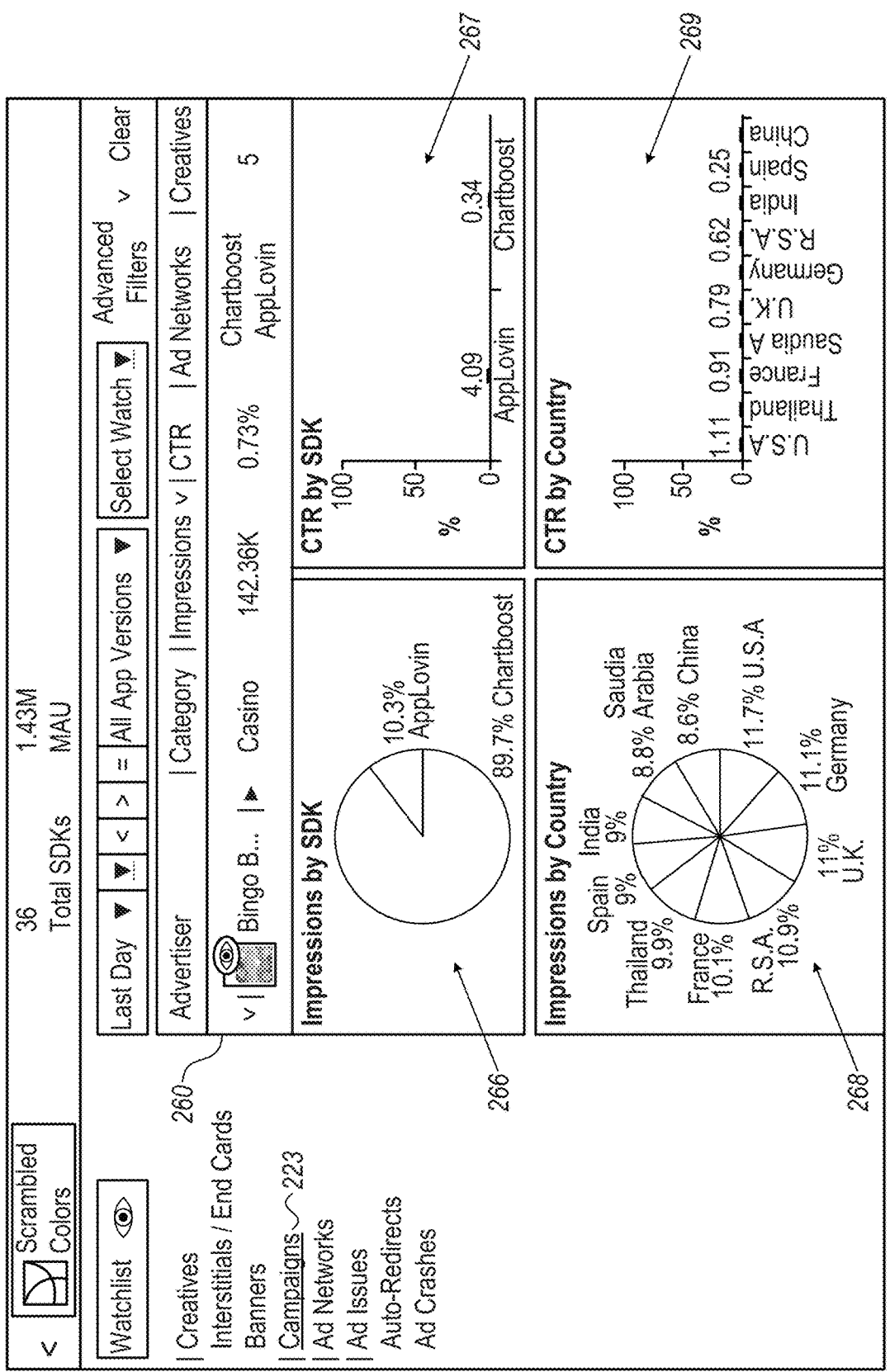

FIG. 2D shows information about campaigns (232). Box 260 represents a campaign. General information about a campaign may be shown, such as CTR of the campaign, total number of impressions, Ad Network through which the campaign is served, number of different creatives associated with the same campaign, or the like. In some exemplary embodiments, a category of the campaign may be displayed. As an example, Casino category may be a potentially problematic category, as opposed to a board game category (Box 262). The developer may flag entire campaigns and block them (Box 264). Additionally or alternatively, campaigns may be added to the watchlist. In some cases, a URL to which the ad is directing when the ad is clicked may be shown, for example, a link to the download page of the application in the application repository (e.g., a page in GOOGLE PLAY™).Additionally or alternatively, a link to the advertiser's website may be given. Additionally or alternatively, a link to the specific landing page to which the user was redirected upon clicking the ad may be provided. It is noted that the same campaign may comprise several different creatives or may have creative-free impressions, such as displaying other kinds of ads (e.g., playable ads, video ends with no end card, or the like). In some cases, only some of the creatives for the same campaign may be blocked, while in others the campaign itself may be blocked. For example, the developer may block a campaign promoting the use of illegal products or services, while she may block creatives that appear corrupted without blocking the entire campaign. As yet another example, inappropriate content may be an issue of a certain creative which uses sexual and sensual images, while other creatives for the same campaign may not use such prohibited imagery. See More button (261a) may be pressed to view additional information about the campaign, as is illustrated in FIG. 2E.

Additional information may include information about the audience and about performance of the campaign. Pane 266 shows impressions by SDK. The same campaign is shown to be served by different SDKs. Total and relative numbers may be displayed.

Pane 267 shows performance of the same campaign in different SDKs, indicating that a AppLovin SDK better matches the campaign to users than Chartboost SDK, as it out-performs it substantially (e.g., 4% CTR v. 0.34% CTR). Pane 268 shows geographic information about the audience to which the impressions of the campaign were served. Pane 269 shows CTR metrics split based on country, indicating US audience engage better to the campaign than Spanish audience (e.g., 1.11% v. 0.25%).

Figure 2F:
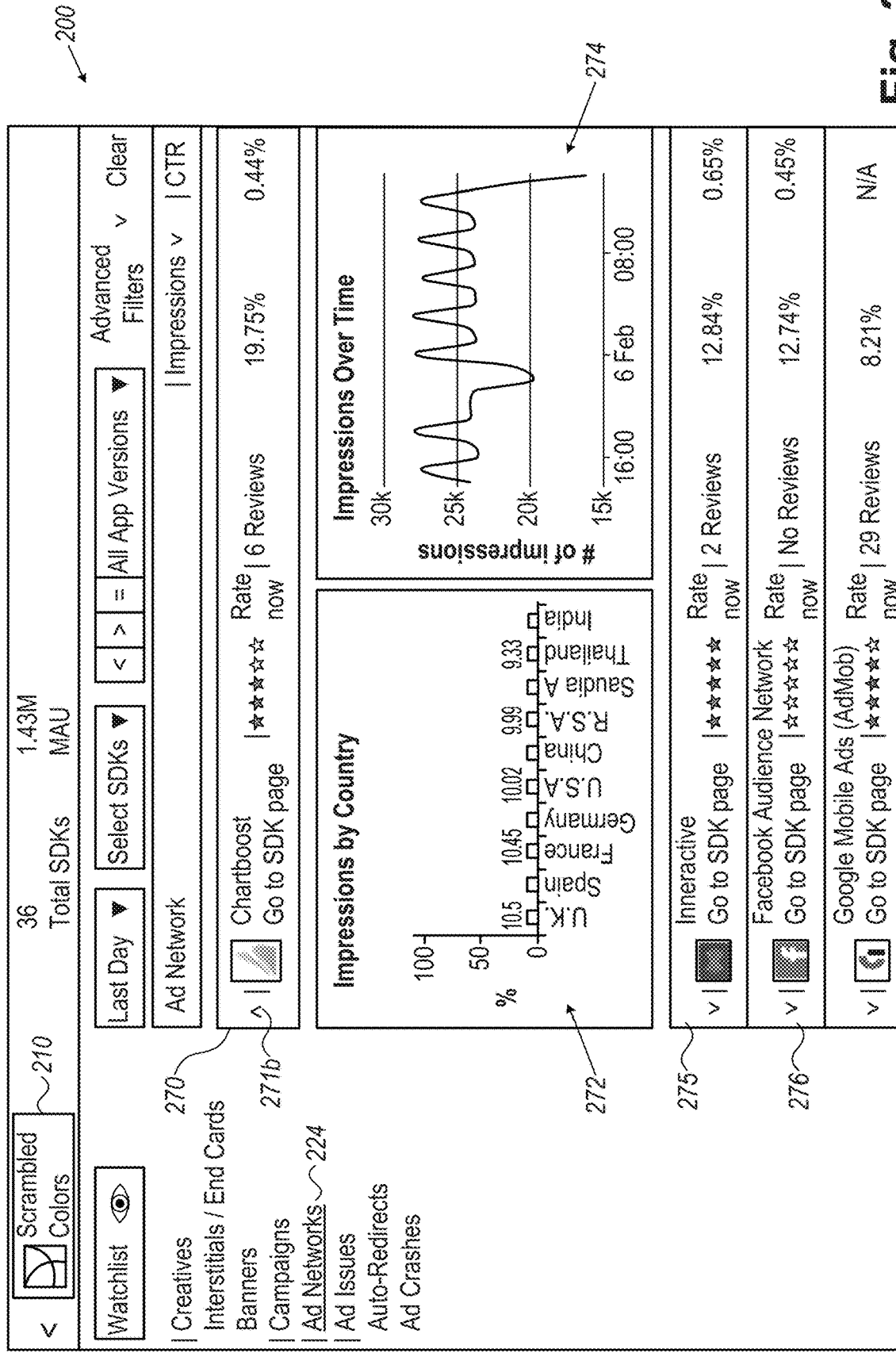

In FIG. 2F, Ad Networks (224) mode is shown. Box 270 represents an Ad Network. The name of the network, a link to an SDK serving ads from the network, performance metrics (e.g., CTR, number of impressions, portion of the impressions served by the program) may be displayed. In some cases, users may review networks, such as provide positive or negative feedbacks on networks and such information may be displayed. See More button (271b) may be used to view additional information such as Impressions by Country Pane 272 showing the audience to which the network served, based on their geolocation (e.g., 10.5% of the impressions served by the SDK was to UK users). Such information may be useful in case that multiple Advertisement SDKs are used and compete over impressions. Such information may indicate quality of the data the network has regarding specific geographic areas (and as a result, its willingness to pay more for serving audience in such areas). Impressions Over Time Pane 274 may show relative and absolute numbers of impressions as a function of time of day. Such information may be useful to track the provisioning of a campaign, such as determine when each campaign is shown. In some cases, such information may be useful to verify that blocking of a campaign was successful, or to identify a change in the campaign impressions after such a total or selective blocking action is taken.

Figure 2G:
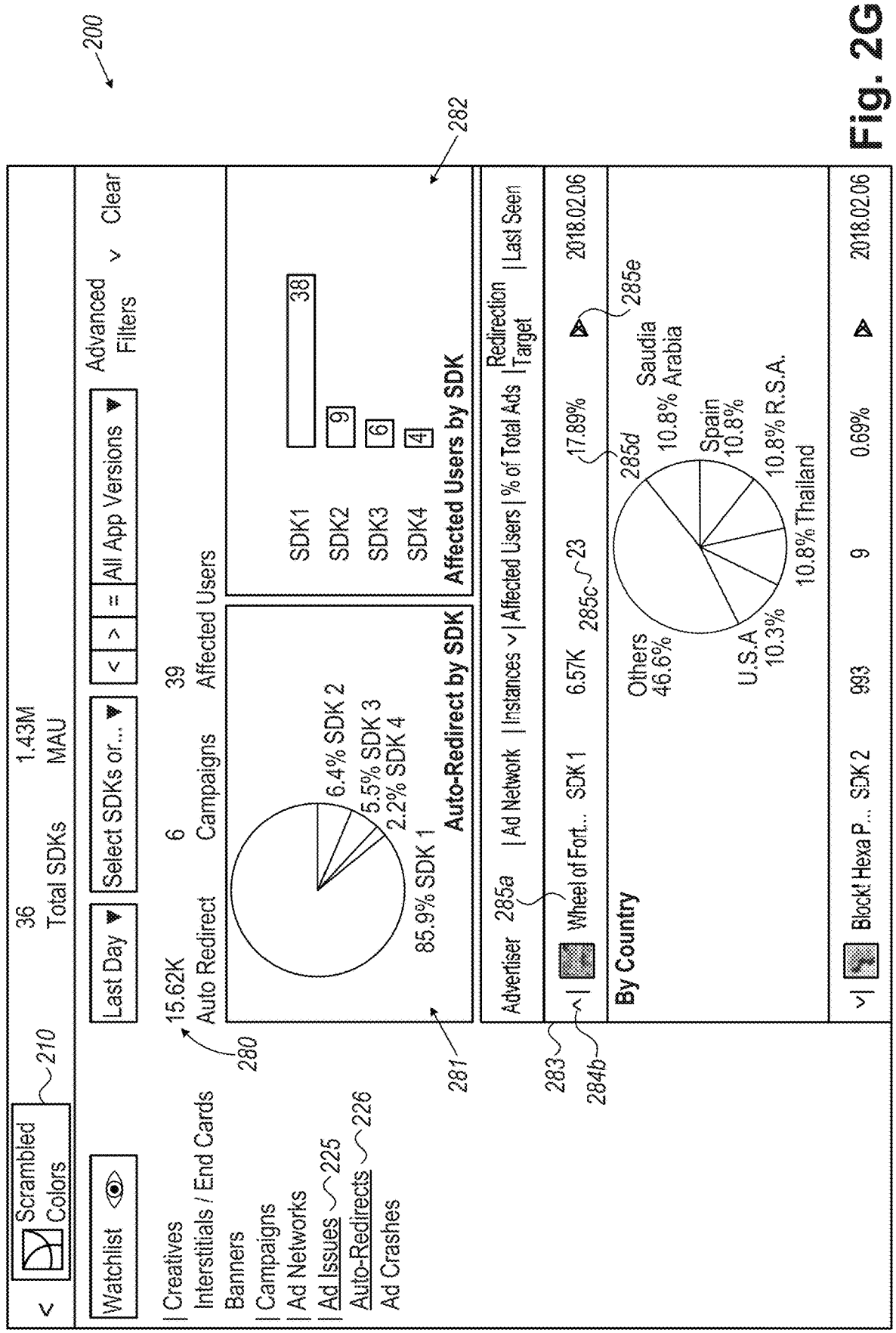

FIG. 2G shows Ad Issues 225, and specifically auto redirects issues (226). General auto-redirect statistics (280) may be shown. The issue of auto-redirect is an example of a potential harmful issue caused by an ad, where the ad automatically redirects the user to a different site, even if the user does not click on the ad. In some instances, the ad will automatically redirect the user out of the program within the first second of its appearance on screen. Such traffic diversion may increase the chances of the user acting upon the ad (e.g., downloading the promoted app), but may be undesired from the perspective of user experience and of the developer and owner of the application. The developer may thus decide that such activity is not allowed and may monitor such activity and block ads implementing it. The total number of redirects (15.62K), a number of campaigns in which auto-redirect is employed (6), and a total number of effected unique users (39) may be displayed. Auto-Redirect by SDK Pane 281 may show which SDKs are responsible for what portion of the auto-redirects. Affected Users by SDK Pane 282 may show a number of effected users by each SDK. For example, SDK1 affected 38 users, while SDK 4—only 4. Box 283 may represent a campaign in which auto-redirect was employed. Name of campaign (285a), serving SDK (285b), instances, affected users (285c), portion of the total ads of the campaign (285d), a redirection target link (285c), last observed auto-redirect/impression, may be shown. Additional information may be available using See More button (284b), such as Audience Demographic Pane 286, indicating demographic information of redirected audience.

Figure 2H:
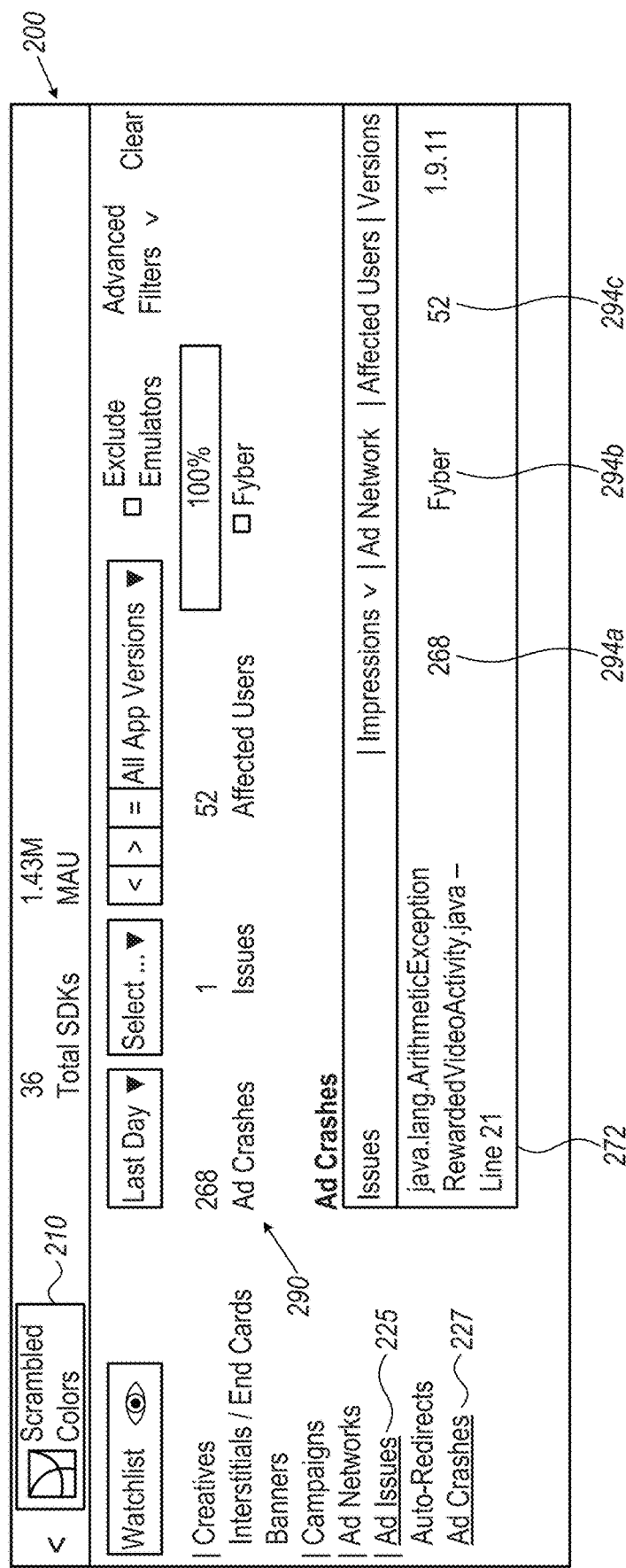

FIG. 2H exemplifies Ad Crashes (227) mode showing information about ads that caused the program to crash. Once the program crashes, a stack trace may be obtained and analyzed to determine which method, class, function or other software component caused the crash. It may be determined whether the crash occurred due to program code or due to SDK code (e.g., directly or indirectly by invoking other system methods, such as system calls and library functions).

General Information 290 may be provided, such as a total number of issues, total number of ad crashes, a total number of affected users, a partition between different SDKs and Ad Networks of the ads causing the crashes, or the like.

Box 292 may represent an ad crash issue. Information about the crash may be shown, such as a log file, exception thrown, or the like. Instances of the crash (294a) may be displayed. Ad Network through which the ad was served (294b) may be displayed. A number of affected users (294c) may be displayed. A version of the program in which the issue occurred (or multiple versions) may also be displayed. In some cases, a portion of the instances of the ad that caused the ad issue may be displayed, including information relating to the audience, such as OS, device, and other technical information which may relate to the crash. In some cases, additional information such as advertiser, Creative ID and other various information obtained on the ad may be displayed, either by crash instance or by percentage of overall specific crash type/stack trace. In some cases, the developer may block the ad altogether, may block it for a subset of the audience, such as audience having characteristics that caused the crash (e.g., same OS, same device, same program version, or the like).

Figure 3:
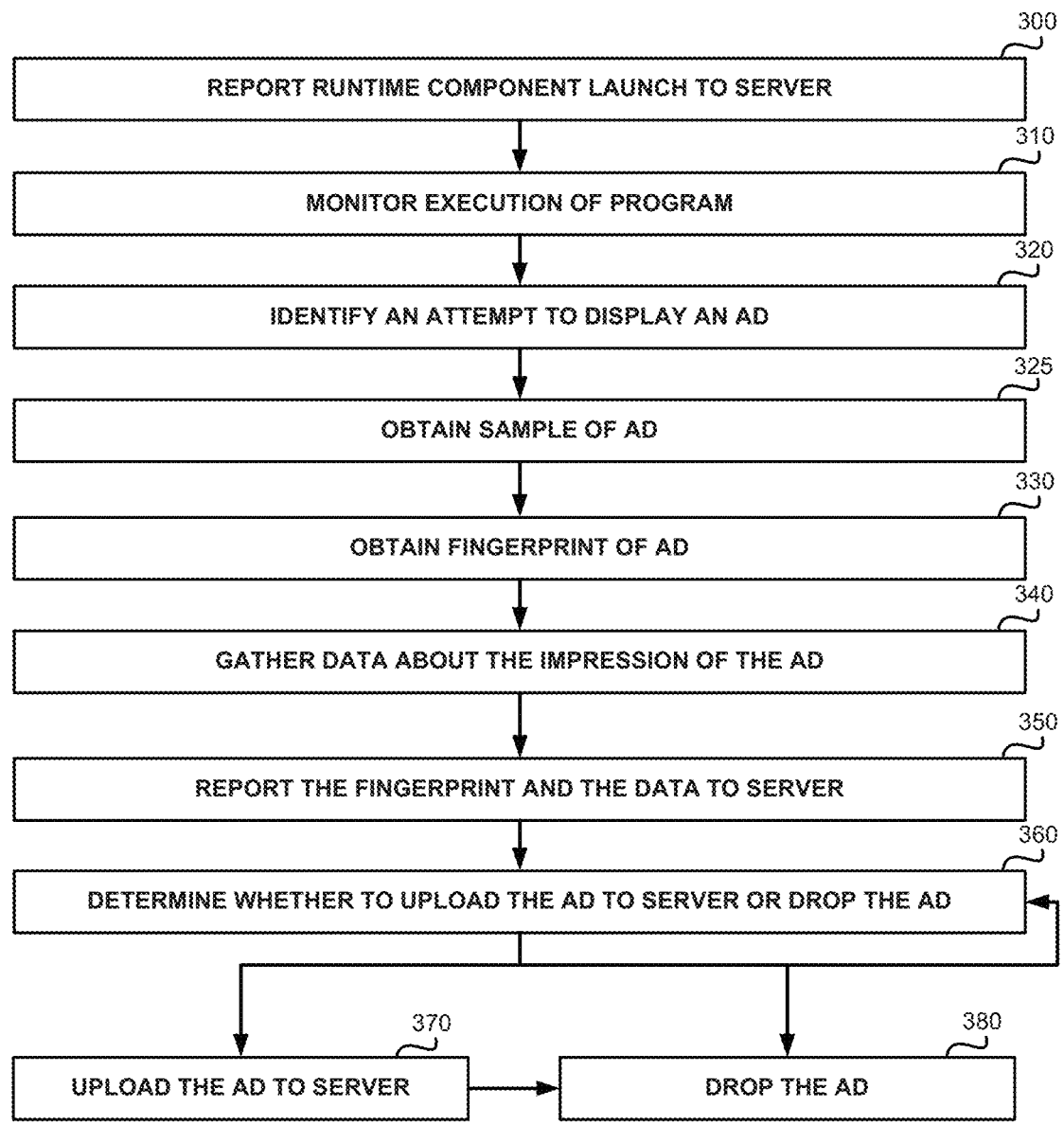
FIG. 3 shows a flowchart diagram of a method, in accordance with some exemplary embodiments of the disclosed subject matter.

Referring now to FIG. 3, showing a flowchart diagram of a method, in accordance with some exemplary embodiments of the disclosed subject matter.

On Step 300, the runtime component may report being launched to the server. The server may utilize such information to track active users statistics for the program. The runtime component may report to the server its identity, identity of the program or the like. It is noted that in some cases, the runtime component may be linked statically or dynamically, or compiled into the program. The runtime component may be launched when the program is launched, as part of the initialization procedure of the program.

On Step 310, execution of the program may be monitored. In some cases, the monitoring may be performed so as to identify attempts to display advertisements. In some cases, the runtime component may monitor execution to identify crashes, auto-redirections, or the like.

On Step 320, an attempt to display an advertisement may be identified. In some cases, identification of a display attempt may involve identification of visual objects that are issued by an Advertisement SDK. In some cases, visual objects that are created by SDKs may be considered as potential advertisements even if the SDK is not a-priori known to be an Advertisement SDK. In some cases, media display attempt by the program code itself (e.g., directly performed by the code of the program and not of any third-party component integrated into the program) may be ignored, as such media may be considered as purposely integrated into the program by the developer herself. FIG. 4 shows an embodiment of identification of attempts to display ads.

On Step 325, a sample of the ad may be obtained. The sample of the ad may be the media itself. In some exemplary embodiments, the sample may be a downgraded sample for purposes of reducing the size of the sample. As an example, the runtime component may render the ad into a visual context having lower resolution than the screen of the device. For example, instead of rendering in HD, the media may be rendered in LD.

In some exemplary embodiments, the media may be a dynamic media, such as animated GIF, a video, or the like. A plurality of samples of the media may be obtained to determine whether the media is static (e.g., identical samples are repeatedly obtained) or dynamic (different samples are obtained). In some cases, samples are obtained repeatedly until each consecutive sample was already obtained for a predetermined number of samples. Such may be the case in animated GIFs, comprising a limited number of images. As a result, after sampling the same media over and over, all images of the animated GIF may have already been encountered. As another example, a video may end in a static display which may remain and may repeatedly obtained when the media is re-sampled. Additionally or alternatively, in media that is obtained from a URL, the URL itself may be obtained as a lightweight representation of the media, which may also function as a fingerprint thereof.

On Step 330, a fingerprint of the ad may be obtained. The fingerprint may be a URL from which the media is obtained, such as including an HTTP GET parameter indicating an identifier of the ad, but excluding HTTP GET parameters indicating information relating to the audience, affiliate, serving program, or the like. Additionally or alternatively, the fingerprint may be a hash value computed from the media itself. In some exemplary embodiments, perceptual hashing may be computed for the media, thereby allowing for similar images to have similar hash values. Values within a predetermined distance may be considered as relating to the same media. For example, due to different resolutions, different hashing values may be computed for the same advertisement. However, using perceptual hashing, the distance between the values may be relatively small (e.g., below a predetermined threshold), and indicative that both are hash values of the same ad, albeit their difference. It is noted, however, that using deterministic perceptual hash functions, the same media would provide the exact same value. As a result, if for the same media, two different perceptual hash values are computed by the runtime component, such difference may indicate that the media is dynamic, even if the distance between the two values is below the threshold. Hence, the perceptual hash value may be required to be exactly the same when determining whether the media is static or dynamic, but minor differences in the perceptual hash values may still be considered as identifying the same ad, when used as an identifier of the ad (e.g., in the ads database).

It is noted that using a perceptual hash is just one way of achieving the goal of identifying to different medias as a same ad, such as in view of different resolutions or other potential distortions. The disclosed subject matter may employ other methods for achieving such goal. As another example, a machine learning classifier may be trained to identify non-identical images that match, such as using a training dataset, and applied on a testing set. In some cases, a clustering algorithm may be employed to identify clusters of similar non-identical images that represent the same image.

On Step 340, data about the impression of the ad may be gathered. The data may include information relating to the audience to which the ad was served (e.g., device, OS, demographic information, or the like). The data may include information about the ad, such as ad sizes, proportions, refresh rate, or the like. The data may further include information regarding performance of the ad. In some cases, performance information may be obtained in a later time, after the ad is served. The performance information may indicate whether the ad was clicked, how long the ad was displayed, or the like. In some exemplary embodiments, the performance information may include information regarding ad issues, such as crashes and auto-redirects.

On Step 350, the fingerprint and the data may be transmitted to the server. In some exemplary embodiments, at first, initial data and the fingerprint is transmitted even prior to serving and displaying of the ad. After the ad is served, a second transmission may be performed so as to provide performance-related data.

In response to the transmission, the server may be notified that the runtime component retains a sample of the ad and awaits instructions as to whether or not to upload the sample. In some cases, the server may have already obtained a sample of the ad from another source, such as another instance of the runtime component that is being executed together with another instance of the same program. Additionally or alternatively, the sample may be previously reported by another runtime component that monitors ad serving of another program, not developed by the developer but rather by a different developer. In such a case, the server may notify the runtime component that it may drop the sample (380). Additionally or alternatively, the runtime component may wait for a predetermined amount of time before dropping the ad (380), such as a day, a week, or the like. In some cases, if the runtime component detects that the device is running out of space, of if the runtime component retains a number of other samples exceeding a threshold, the sample may be dropped. In some cases, samples may be dropped in a First-In First-Out (FIFO) order. Additionally or alternatively, the samples may be dropped in a Last-In First-Out (LIFO) order. Additionally or alternatively, the server may opt to delay the decision as to which runtime component will transmit the ad. The server may provide a timeframe to be used as an opportunity of additional instances runtime components to detect the same ad, so as to allow the server to select between such different instances an instance to upload the ad. The server may notify the runtime component of its decision to postpone to selection, instructing the runtime component to temporarily retain the ad until a decision is made. In some cases, the server may indicate a timeframe for making the decision, and the runtime component may wait until the end of the timeframe before dropping the ad. The timeframe may be extended, such as by an additional instruction of the server. In some cases, prior to dropping the ad, the runtime component may send a transmission to the server, indicating the ad will be dropped and providing an opportunity for the server to instruct the runtime component to upload the ad prior to dropping it. Such may be useful in case that the runtime component is the only current instance retaining the ad.

The server may select one of the runtime components and instruct it to upload the ad. The runtime component may receive such instruction and accordingly upload the ad to the server (370).

Figure 4A:
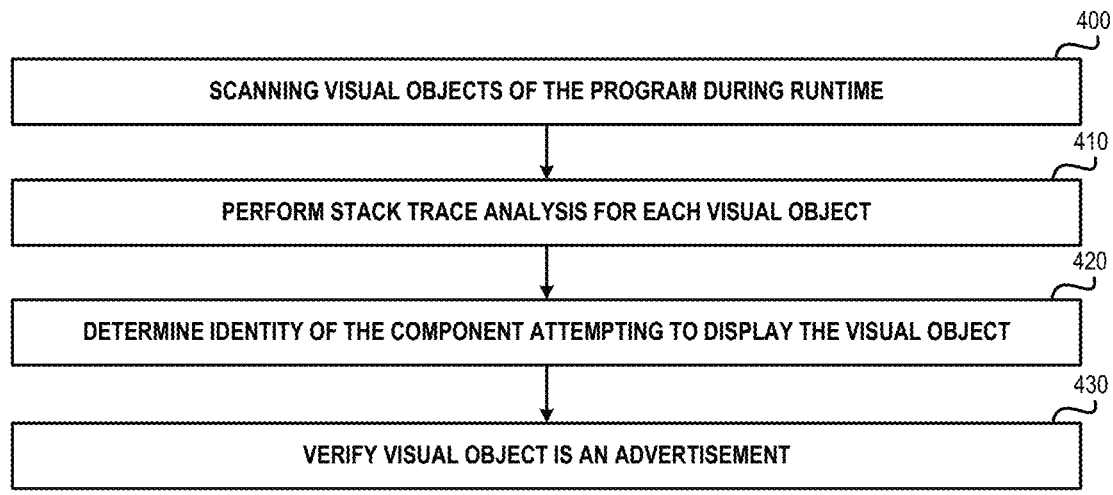
FIG. 4A shows a flowchart diagram of a method, in accordance with some exemplary embodiments of the disclosed subject matter.

Referring now to FIG. 4A, showing a flowchart diagram of a method, in accordance with some exemplary embodiments of the disclosed subject matter.

On Step 400, visual objects of the program may be scanned during runtime. The runtime component may scan the visual objects, such as views and activities. An order of display of the visual objects may be determined, so as to determine which of the visual objects is designed to be displayed and which would be blocked. In addition, properties of the visual objects may be analyzed, such as to determine if a visual object is set to be shown or hidden.

On Steps 410-420, each visual object may be analyzed to determine the component responsible for displaying it. In some cases, the name of the package, class, method, or the like, may be used to identify which software component is responsible for the visual objects. For example, it may be determined which SDK is responsible for showing a visual object. In some cases, it may be determined that the developer's code itself, and not code of any SDK, is responsible for the visual object. In some cases, stack trace analysis may be performed to identify the component. In some cases, the identified component may be known to be an Advertisement SDK, and therefore the visual object may be assumed to be an ad. However, in some cases, other SDKs may not be a-priori known to be Advertisement SDKs, or may be non-Advertisement SDKs that do serve ads (e.g., using another ad service) during their operation.

On Step 430, it may be verified that the visual object is indeed an advertisement. The verification may be performed based on the properties of the ad, such as proportions, aspect ratio, or the like. Ads may have well-known sizes and proportions, such as a typical banner being 320×50 pixels in size. To accommodate different device screen resolutions, proportions may be utilized rather than exact sizes. Different proportions and aspect ratios may be utilized for verification based on the size and resolution of the device screen, such as only the proportions and aspect ratios suiting the device screen. In some cases, the orientation of the screen may set a different display mode, such as layout display or portrait display, and may affect sizes, proportions and aspect ratios of displayed ads, and accordingly may be used to select the potential values of ads. In some exemplary embodiments, if the view size is defined so as to occupy the entire screen, the ad may be identified as an interstitial. Additionally or alternatively, the creation of an Activity object (e.g., in Android™ by registering to activity lifecycle) may be identified. The Activity object may be identified as an interstitial. In some cases, only Activity objects of SDKs may be identified as interstitials.

Figure 4B:
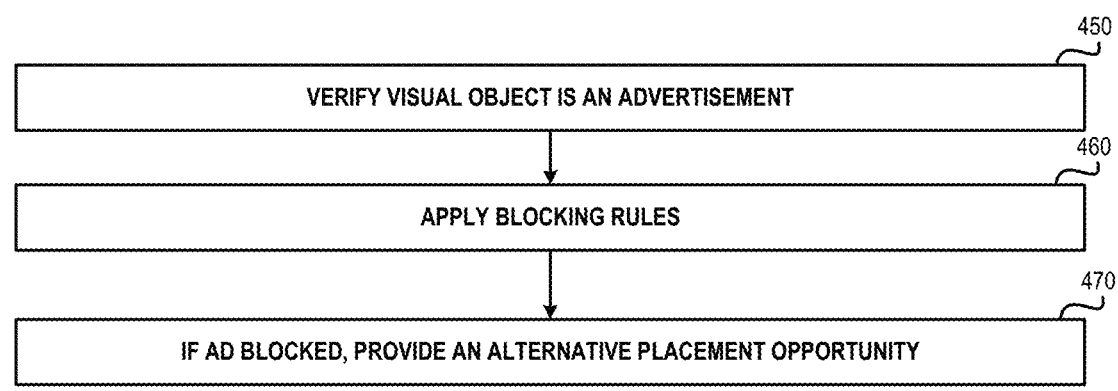
FIG. 4B shows a flowchart diagram of a method, in accordance with some exemplary embodiments of the disclosed subject matter.

Referring now to FIG. 4B, showing a flowchart diagram of a method, in accordance with some exemplary embodiments of the disclosed subject matter.

On Step 450, an advertisement to be displayed may be identified. In some exemplary embodiments, the identification may be performed by monitoring outgoing and incoming communications to intercept messages related to serving of ads. In some cases, an incoming communication providing a served ad may be identified. The incoming communication may be identified based on the protocol being utilized by the Advertisement SDK, by the Ad Network, by the Ad serving server, or the like. In some cases, from the communication, metadata relating to the ad may be obtained, such as the campaign identifier, the advertiser identifier, the creative identifier, a URL from which the ad itself is obtained, or the like. Additionally or alternatively, an outgoing request to receive an ad may be identified and may be used to heuristically anticipate the incoming communication with the information regarding the ad. It is noted that although at such point the media itself may already be provided, the actual rendering of the media may not be known and as a result the actual media to be displayed may not be available. In some cases, the ad may be provided as an HTML document, only a portion of which is displayed to the user.

Additionally or alternatively, during the creation of the visual objects, the runtime component may force the visual objects to remain hidden or obscured by other objects until their content is identified and handled.

On Step 460, blocking rules may be applied. In some cases, certain ads may be blocked, certain campaigns may be blocked, or the like. Additionally or alternatively, the blocking rules may be applied based on the characteristics of the device or the user. For example, this may be used to avoid serving ads violating US law to US devices. As another example, this may be used to avoid serving ads to devices in which the ad has a high likelihood of causing a crash. The same ad or campaign may be blocked only in some of the cases, depending on the blocking rules. The blocking rules may be defined by the developer, such as using the dashboard, and may potentially reduce her revenue from the program.

On Step 470, in case the ad is blocked, the ad is not displayed. The same placement opportunity may be used. The runtime component may provide the same placement opportunity to an ad network, such as via an Advertisement SDK, and potentially provide a replacement ad. In some cases, the replacement ad may be provided without the use of Advertisement SDKs or Ad Networks, to reduce the likelihood of another ad to be blocked. In some cases, the Advertisement SDK may be invoked and new ads may be provided until being served with an ad that is in line with the blocking rules. In some cases, a predetermined number of attempts, or predetermined timeframe, may be provided for the attempt to find an alternative ad. In some cases, in case no such ad is obtained, a public service announcement may be displayed.

Figure 5:
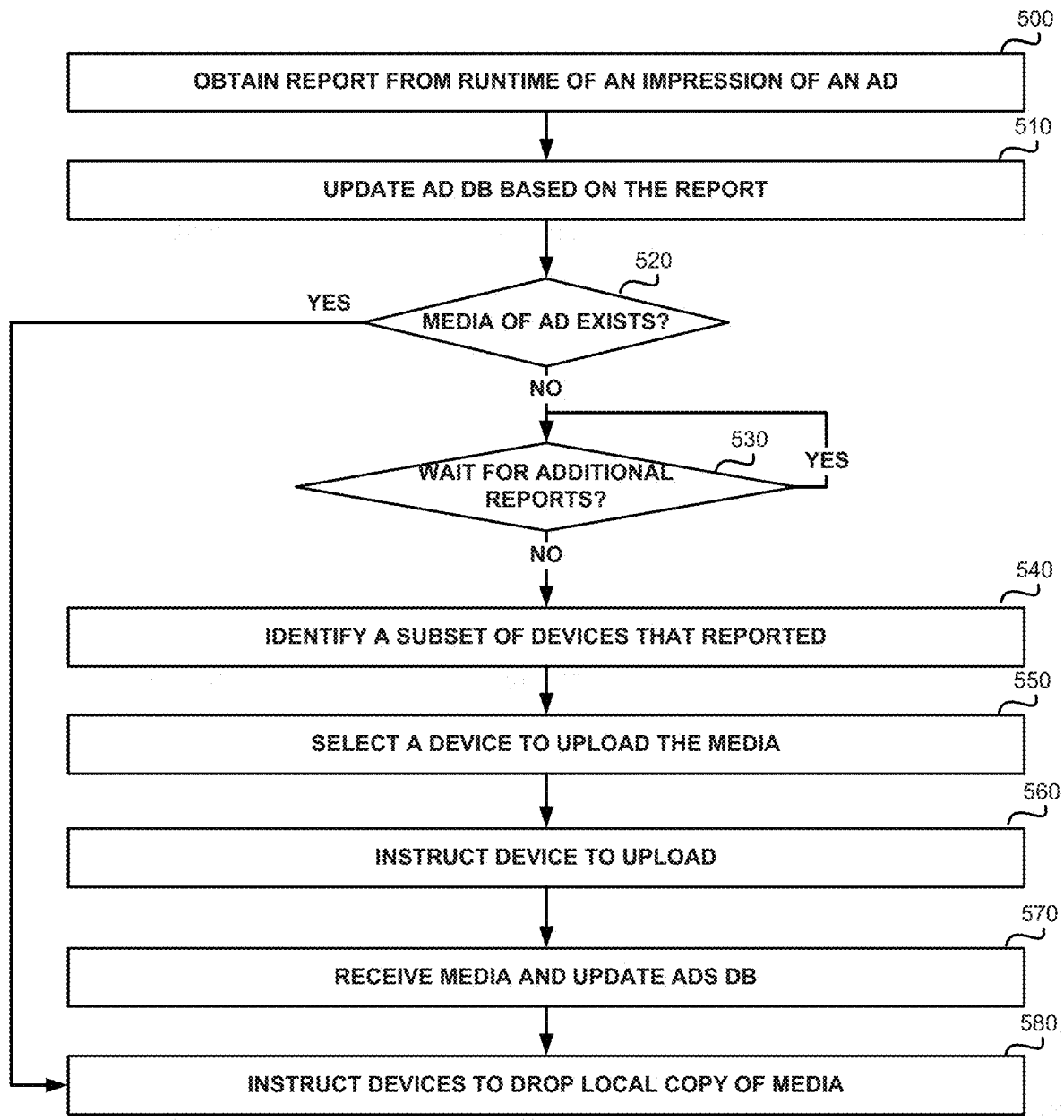
FIG. 5 shows a flowchart diagram of a method, in accordance with some exemplary embodiments of the disclosed subject matter.

Referring now to FIG. 5, showing a flowchart diagram of a method, in accordance with some exemplary embodiments of the disclosed subject matter.

On Step 500, a report from a runtime component of an impression of an ad is obtained by a server. The report may indicate the fingerprint of the ad, and potential data regarding the ad and the audience. In some exemplary embodiments, performance data relating to the ad may be obtained at the same time or in a separate report.

On Step 510, an Ads DB may be updated based on the report. The Ads DB may be updated to include an entry for the ad, if one does not already exist. If the entry already exists, the record may be updated with the information from the report, so as to provide the database with aggregated data relating to the ad.

If the media of the ad does not already exist in the Ads DB (520), the server may perform a method to request a sample of the ad to be uploaded thereto. In some cases, the server may wait for additional reports (530), so as to increase the population of runtime components having samples of the ad. The subset of devices that reported the ad may be identified (540). In some cases, the identified subset may be the subset of the devices that still retain the sample, such as for example, excluding devices that reported that they need to drop their locally retained sample.

On Step 550, a device is selected to upload the ad. The selection may be based on resources available to each device, such as battery level, bandwidth, bandwidth cost, or the like. The selection may be performed so as to attempt to distribute the load between different devices, so as to provide a balanced resource utilization of the crowd of devices at the disposal of the server.

The selected device is instructed to upload the sample of the ad (560), and once the ad is received from the device (570), the Ads DB may be updated to retain the sample. After the Ads DB is updated with the sample, no additional sample may be required in future reports of the same ad. After the sample is obtained, the server may instruct the uploading device to drop the local copy of the sample. The server may also instruct other devices that the sample is no longer needed and may be dropped (580).

In some exemplary embodiments, the ad sample obtained by the server may be verified by the server to match the fingerprint. In some cases, the server may compute the conceptual hash value of the sample and verify that it matches or within a predetermined distance from the fingerprint it has on record. If the sample does not match, or if the received sample got corrupted, the server may select another device and instruct such other device to upload its sample (550-570)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product comprising:
    a non-transitory computer readable medium retaining program instructions of a runtime component;
    wherein a developer of a program integrated the runtime component with the program, whereby the runtime component is operatively coupled with the program;
    wherein the program instructions, when executed by a user device, cause the user device to:
        monitor execution of the program on the user device;
        identify an attempt by a component of the program to display media to a user of the user device, wherein the component is a third-party component developed by a different developer than the developer and integrated with the program by the developer;
        obtain runtime data associated with the media, wherein the runtime data is obtained during execution of the program;
        determine a fingerprint of the media;
        transmit to a server the runtime data and the fingerprint, whereby transmitting lightweight data to the server;
        determine, based on blocking rules, whether to allow the media to be displayed, wherein the blocking rules are determined by the developer, whereby the developer selectively blocking a portion of medias served by third-party component and
        in response to a request received from the server or lack thereof, determine whether to drop the media or transmit the media to the server;
        whereby providing the server with aggregated data about different medias displayed by third-party components by different instances of the program executed by different user devices.

2. The computer program product of claim 1, wherein the third-party component is a Software Development Kit (SDK) that is compiled into the program by the developer.

3. The computer program product of claim 2, wherein the SDK is an advertisement SDK configured to serve advertisements to users of the program, wherein the media is an advertisement.

4. The computer program product of claim 3, wherein the advertisement is selected from a group consisting of: a static image, a dynamic image, a video, and an interactive advertisement.

5. The computer program product of claim 1, wherein the runtime component is configured to heuristically verify that the media is an advertisement based on the media being displayed by Software Development Kits (SDK) and not by the program.

6. The computer program product of claim 1, wherein the runtime component is configured to heuristically verify that the media is an advertisement based on the media being displayed by an Advertisement Software Development Kit (SDK) and not by the program or by other SDKs.

7. The computer program product of claim 1, wherein the determination of the fingerprint comprises computing a perceptual hashing of the media.

8. The computer program product of claim 7, wherein the program instructions, when executed, are configured to cause the user device to compute the perceptual hashing a multiplicity of times to obtain multiple hashing values; and to compare the multiple hashing values to determine whether the media is static or dynamic.

9. The computer program product of claim 1, wherein the determination of the fingerprint comprises obtaining a Uniform Resource Locator (URL) from which the media is played, wherein the fingerprint is the URL.

10. The computer program product of claim 1 wherein the program instructions, when executed, are configured to cause the user device to verify that the media is an advertisement, wherein the verification comprises comparing aspect ratio of the media with a set of aspect ratios used by advertisements for a device having a displayed aspect ratio as of the user device.

11. The computer program product of claim 10, wherein in response to the verification, the runtime component is configured to notify the server that the component is potentially an Advertisement Software Development Kit (SDK), whereby automatically identifying Advertisement SDKs.

12. The computer program product of claim 1, wherein the runtime component is configured, in response to a second request received from the server, temporarily retaining the media on the user device until the request is received.

13. The computer program product of claim 1, wherein the monitoring of execution comprises: scanning, periodically, visual objects of the program during runtime to identify visual objects associated with an Advertisement Software Development Kit (SDK).

14. The computer program product of claim 1, wherein said monitoring of execution comprises:
    scanning visual objects of the program during runtime;
    for each visual object, determining a component responsible for the visual object, wherein said determining comprises performing stack trace analysis to identify the component; and
    comparing the component with predetermined set of Software Development Kits (SDKs).

15. The computer program product of claim 1, wherein in response to identification of the attempt to display the media, the runtime component is configured to render the media in a resolution lower than a resolution in which the media is to be displayed by the program, whereby down-sampling the media to obtain a lightweight representation thereof.

16. The computer program product of claim 1,
    wherein the component is an Advertisement Software Development Kit (SDK), wherein the media is an advertisement,
    whereby the developer selectively blocking a portion of advertisements served by the Advertisement SDK, thereby potentially reducing generated revenue for the developer from the program.

17. The computer program product of claim 1, wherein the developer integrated the runtime component with the program by compiling the runtime component with the program, by statically linking the runtime component with the program, or by causing the program to dynamically link to the runtime component during execution.

18. The computer program product of claim 1, wherein the runtime component is a Software Development Kit (SDK) provided by a provider different than the third-party and the developer, wherein the developer included the SDK in the program.

* * * * *